United States Patent [19]
Bonnin et al.

[11] Patent Number: 5,858,768
[45] Date of Patent: Jan. 12, 1999

[54] METHOD FOR PURIFYING AND BIODEODORIZING GAS EFFLUENTS

[75] Inventors: Christophe Bonnin, Chennevieres sur Marne; Guy Martin, Cesson Sevigne; Gabriel Coriton, Champigny sur Marne, all of France

[73] Assignee: OTV Omnium de Traitements et de Valorisation, Courbevoie, France

[21] Appl. No.: 779,060

[22] Filed: Jan. 6, 1997

Related U.S. Application Data

[63] Continuation of Ser. No. 333,480, Nov. 2, 1994, abandoned.

[30] Foreign Application Priority Data

Nov. 2, 1993 [FR] France .................................. 93 132226

[51] Int. Cl.$^6$ ........................................................ A61L 9/01
[52] U.S. Cl. ........................ 435/266; 435/264; 435/262.5
[58] Field of Search .................................... 435/262, 264, 435/266, 282, 262.5

[56] References Cited

FOREIGN PATENT DOCUMENTS

| | | |
|---|---|---|
| 0 094 573 | 11/1983 | European Pat. Off. . |
| 0 218 958 | 4/1987 | European Pat. Off. . |
| 0218958 | 4/1987 | European Pat. Off. . |
| 0 224 889 | 6/1987 | European Pat. Off. . |
| 0224889 | 6/1987 | European Pat. Off. . |
| 2 591 122 | 6/1987 | France . |
| 2591122 | 6/1987 | France . |

OTHER PUBLICATIONS

Preliminary Search Report (in French) for FR 9313266, dated 21 Jul. 1994 (citing the above–noted references).
Raterman K., Microbial Treatment of a Synthetic Sour Brine, J of Ind Micro 12 (1993) 21–28.

*Primary Examiner*—Ralph Gitomer
*Attorney, Agent, or Firm*—Merchant Gould Smith Edell Welter & Schmidt

[57] ABSTRACT

A method for the purification and biodeodorizing of a gas effluent charged with pollutant matter is provided. The method includes the steps of passing the gas effluent through a bed of inert granular material used as a support for a biomass. The biomass includes bacteria, majority of which are autotrophic bacteria. Preferably the bacteria are in a form designed to degrade the pollutant material. The method includes the step of sprinkling the bed with a sprinkling liquid and recovering purified biodeodorized gas effluent. Preferably, nutrient elements for the biomass are supplied entirely by the sprinkling liquid, the gas effluent or a mixture thereof.

24 Claims, 2 Drawing Sheets

METHOD FOR PURIFYING AND BIODEODORIZING GAS EFFLUENTS

This is a continuation of application Ser. No. 08/333,480, filed Nov. 2, 1994 now abandoned.

BACKGROUND OF THE INVENTION

1. Field of the Invention

The invention relates to the field of the cleansing or purification and deodorizing of gas effluents.

More specifically, the invention relates to a method that enables a significant abatement of the level of these effluents contained in the pollutants that cause olfactory nuisance, enabling notably an abatement of the concentration in sulfurous compounds and nitrogenous compounds.

Purification stations are the source of many types of olfactory nuisance, chiefly ammonia, organic nitrogenous compounds (such as methylamine, indole and scatole, etc.), sulfurous compounds (hydrogen sulfide, thiols, disulfides) as well as various aldehydes and ketones.

Furthermore, human beings have relatively low and even very low perception thresholds with respect to the volatile sulfurous and nitrogenous species responsible for odors. This results in considerable discomfort to people living in the neighborhood as well as to passers-by.

2. Description of the Prior Art

There are various techniques known in the prior art for the purification and deodorizing of gas effluents.

In one of these techniques, the gas effluents are put through a succession of washing columns or towers, each containing a liquid that has the task of trapping one type of organic pollution. The installation that implements such a technique has at least three towers: one with the task of trapping acidic pH soluble nitrogenous pollutants, another one with the task of trapping low basic pH soluble sulfurous pollutants and yet another one with the task of trapping highly basic pH soluble sulfurous pollutants.

While such installations enable high speeds of passage of gas effluents into the towers, they have the major drawback of taking up a great deal of space. It is sometimes impossible to make use of such installations.

Other techniques consist in trapping the odoriferous molecules in a liquid or within a solid material and in permitting the degradation of these modules by a biomass. Thus bioscrubbers of the type described in the document EP-A-0 218 958 are known in the prior art. In such installations, the treated gas is first of all placed in contact with a biomass in an aqueous phase so as to transfer a part of the pollutants in the gas phase to the biomass. This biomass is then conveyed to a reactor in which the pollutants are degraded.

However, such installations enable the elimination only of constituents that are soluble at the pH of the aqueous phase used. They do not enable the elimination of pollutants that are not soluble in water at the pH considered.

There also exists known biowashers wherein the pollution is trapped in a washing water and then degraded in a second reactor by an appropriate biomass, and biofilters in which the pollution is trapped by a material on which it is adsorbed and/or absorbed so as to enable its subsequent degradation by bacteria.

It is more specifically to the technique of biodeodorization on biofilters that the invention pertains.

Thus, in the prior art, there is a known method for the deodorizing and purification of gas containing biodegradable pollutants consisting in making the gas pass through a support formed by layers of peat in the presence of microorganisms, and in wetting said layers with aqueous solutions that bring complementary additional nutrients. This technique is described in the document FR-A-2 519 122. The biomass used in such a technique consists essentially of heterotrophic bacteria using, as a carbon source and nitrogen source, the organic material present in peat and in a nutrient sprinkling solution that contains organic carbon.

Other methods using adsorption on materials such as active carbon are known. However, to implement such methods at high delivery rates, it is necessary to build costly installations.

Although such techniques make it possible to obtain efficient deodorizing results, they have a certain number of drawbacks.

First of all, they do not permit treatment ensuring that nuisance thresholds will be obtained when the effluents are highly charged with pollutants. Thus, the performance characteristics of such biofilters drop when the hydrogen sulfide content exceeds 15 to 20 milligrams per liter.

Secondly, such techniques have the drawback of not enabling very high speeds of passage. This makes it necessary to configure the filters so that they have a large filtration surface area. In practice, the speeds of treatment that can be achieved with such installations do not exceed 100 meters per hour.

Finally, biofilters using layers of peat also have the drawback of reacting slowly to sudden changes in load, and this limits their range of use.

There are also known biofilters implementing a heterotrophic biomass on an inert support such as those described in the documents EP-A-94 573 or EP-A-224 889.

These biofilters have the drawback wherein they can eliminate only one type of pollution at a time (for example $H_2S$) and are capable of working only with low speeds of treatment (lower than 100 meters an hour).

The aim of the present invention is to provide a method of bio-deodorization that does not have the drawbacks of prior art techniques.

In particular, one of the aims of the present invention is to describe a method enabling the treatment of gas effluents that could be highly charged with pollutants.

Another aim of the present invention is to provide a method that can be used to cope efficiently with sudden and frequent variations in the pollution load contained in the effluents without prompting any major reduction in the rates of abatement of this pollution.

Another aim of the invention is to provide an installation for the implementation of such a method having sizes that are far smaller than those of the prior art installations, including biofilters using layers of peat.

SUMMARY OF THE INVENTION

These different aims as well as others that shall appear hereinafter are achieved by means of the invention which relates to a method for the purification and bio-deodorizing of a gas effluent charged with organic pollutant matter, $H_2S$ and $NH_3$, wherein said method comprises the steps of:

making said gas effluent pass through a bed of inert inorganic granular material used as a support for a biomass constituted by bacteria, a majority of which are autotrophic bacteria, designed to degrade said pollutant material at a speed greater than or equal to 400 meters/hour, sprinkling said bed with a sprinkling liquid, recovering the purified and bio-deodorized gas effluent at the outlet of said bed, the nutrient elements needed by the biomass being supplied entirely by said sprinkling liquid and/or said gas effluent, the unit formed by said bed of inert inorganic granular material and said biomass constituted chiefly by autotrophic bacteria enabling the concomitant degradation of said pollutant material by physical/chemical means and by biological means.

Thus, the biomass used in the context of the present invention is an autotrophic biomass, namely a biomass capable of using the carbon and nitrogen that it needs in mineral form.

The support of the biomass used in the context of the present invention has the particular feature of being inorganic and inert in relation to the biomass, in the sense that it cannot be consumed in any form whatsoever by this biomass.

Furthermore, the use of speeds greater than or equal to 400 meters/hour is a considerable advantage as compared with the prior art methods which do not permit the use of speeds of over 100 meters/hour.

According to one variant of the invention, said nutrient elements needed for said autotrophic biomass are supplied entirely by the liquid used to sprinkle the granular bed.

This sprinkling liquid then has two roles:

a first role consisting in wetting the bed of inert granular material used as a support for the biomass;

a second role consisting in supplying the nutrient elements needed for this biomass.

According to another variant of the invention, these nutrient elements are supplied by the treated gas effluent itself. All that the sprinkling liquid then has to do is to fulfil its essential role of wetting the bed of inert inorganic material. This bed should nevertheless contain the phosphates needed for the development of the biomass.

Preferably, the method according to the invention has a complementary step for the recirculation of at least one part of the sprinkling liquid at its exit from said bed. Such a recirculation has the advantage of providing for savings as regards the biomass and of enabling the concentration of the nutrient elements.

According to another preferred variant of the invention, said recirculation step is accompanied by a step to regulate the pH of said sprinkling liquid at an essentially neutral pH (6 to 8) or an alkaline pH (8 to 14). Indeed, the degradation of the sulfurous compounds within the inorganic granular material is expressed by the releasing of H+ ions which give rise to the gradual acidification of the medium. It is therefore desirable to neutralize or alkalize this medium in such a way that the acidity produced does not adversely affect the development of the biomass.

Preferably, said step for the regulation of the pH is done by the addition of potassium to said sprinkling liquid. Indeed potassium has the advantage, as compared with soda, of not releasing ions likely to hamper the growth of the bacteria.

It will be noted however that it is also possible, in other embodiments of the invention in which at least a part of the sprinkling liquid is recirculated, to envisage the regulation of the pH of the sprinkling liquid at an acidic pH (below 6). In such an embodiment of the invention, the autotrophic bacteria constituting the biomass fixed to the bed of granular material will then draw most of the carbon needed for their development from the $CO_2$ gas coming from the degassing of the carbonates present in said sprinkling liquid.

It will also be noted that it is also possible discharge of the sprinkling liquid at its exit from the granular bed, without recirculation and with no regulation of the pH of this liquid.

According to one variant of the invention, said step for the sprinkling of said bed of inorganic granular material is done continuously.

According to another particularly worthwhile variant of the invention, said step for the sprinkling of said inorganic granular material is carried out discontinuously in order to alternate periods of the sprinkling of said bed with periods of the non-sprinkling of said bed.

Preferably, said periods of the non-sprinkling of said bed do not exceed 24 hours.

Advantageously, said step of making said gas effluent go through said inorganic granular material and said step of sprinkling said bed with a sprinkling liquid are done in such a way that said gas effluent undergoes a rising motion in said bed of inorganic granular material and said sprinkling liquid undergoes a descending motion in said bed of inorganic granular material in a counterflow to said gas effluent.

When the operation is conducted with a neutral pH or slightly basic pH, the degradation of the sulfurous compounds permits the establishment of an acid gradient within the bed of inorganic material through the formation of $H_3O+$ ions. This acidity enables the elimination, by physical/chemical means, of the organic nitrogenous compounds going through the bed of granular material (essential ammonia) and their conversion into ammonium ions after the transfer of ammonia in liquid phase. This physical/chemical conversion is all the greater as the medium is acidic. It is therefore greater in the lower part of the biofilter.

The invention therefore makes it possible to carry out, in the same filter, both the biodegradation of the sulfurous compounds and the physical/chemical elimination of the organic nitrogenous compounds.

In this respect, it will be noted that the ammonium ions present in the sprinkling liquid when it comes out of the biofilter could advantageously be used as nutrients when the method according to the invention is implemented in recirculation mode. Thus, the supply of nutrients in the sprinkling liquid will be reduced.

When, according to the invention, the nutrient elements needed by the biomass are conveyed by the gas effluent itself, this effluent preferably has more than 1 mg/m$^3$ of ammonia and more than 1% of $CO_2$. These quantities of ammonia and $CO_2$ may be present either naturally in the gas effluent or may be provided by doping this gas effluent before its entry into said bed of inert inorganic granular material.

When said nutrient elements are supplied by the sprinkling liquid, said sprinkling step for the sprinkling of said bed of inorganic granular material is preferably carried out with a liquid having a minimum ammonia nitrogen content of over 1 mg/l.

Also preferably, this liquid has a minimum carbonates content of 10 mg/l.

Also preferably, this liquid has a minimum phosphates content of over 0.01 mg/l.

These minimum content values could either be obtained naturally by the presence of the substances concerned in the liquid used as a sprinkling liquid or be adjusted by the addition of the desired nutrients to this liquid.

Advantageously, said inert inorganic granular material is a mineral that can notably be chosen from the group consisting of clay, clay slates, alumina, activated alumina, zeolites, sand, gravel, anthracite and activated carbon.

Also advantageously, said inorganic granular material has a grain size of over 1 mm.

According to a preferred variant of the invention, said biomass has autotrophic bacteria enabling the oxidizing of the sulfurous compounds chosen from the group constituted by *Thiobacillus thiooxydans, Thiobacillus thioparus* and *Thiobacillus intermedius*.

According to one variant of the invention, the method includes an additional step of making said gas effluent pass, at its exit from the bed of inorganic granular material supporting said biomass, over at least one refining filtration unit attached to said bed or separate from it, in a rising flow or in a descending flow.

Although any other type of refining filtration unit may be considered, this unit will be preferably constituted by at least one bed of activated carbon in granular form.

According to one variant of the invention, said step of sprinkling said bed of inorganic granular material is carried out by means of water chosen from the group constituted by water from drillings, natural or supplemented water and outlet water from waste-water purification stations. Such water generally has a sufficient nutrient content to enable the development of the autotrophic biomass. If need be, this content will be adjusted so as to meet the minimum values indicated here above.

The invention also relates to an installation for the implementation of such a method, said installation comprising:

a vessel having an upper chamber and a lower chamber separated by a screen, means to convey an effluent gas provided in said lower chamber, an inert inorganic granular material seeded with an autotrophic biomass filling at least a part of said upper chamber, and means to sprinkle said granular material present in said upper chamber by means of a sprinkling liquid.

Preferably, said installation has means for the recirculation of said sprinkling liquid.

Also preferably, said installation has means to regulate the pH of said sprinkling liquid.

BRIEF DESCRIPTION OF THE DRAWINGS

The invention as well as its different advantages will be understood more clearly from the following description of two exemplary embodiments made with reference to the appended drawings of which.

DETAILED DESCRIPTION

Figure 1:
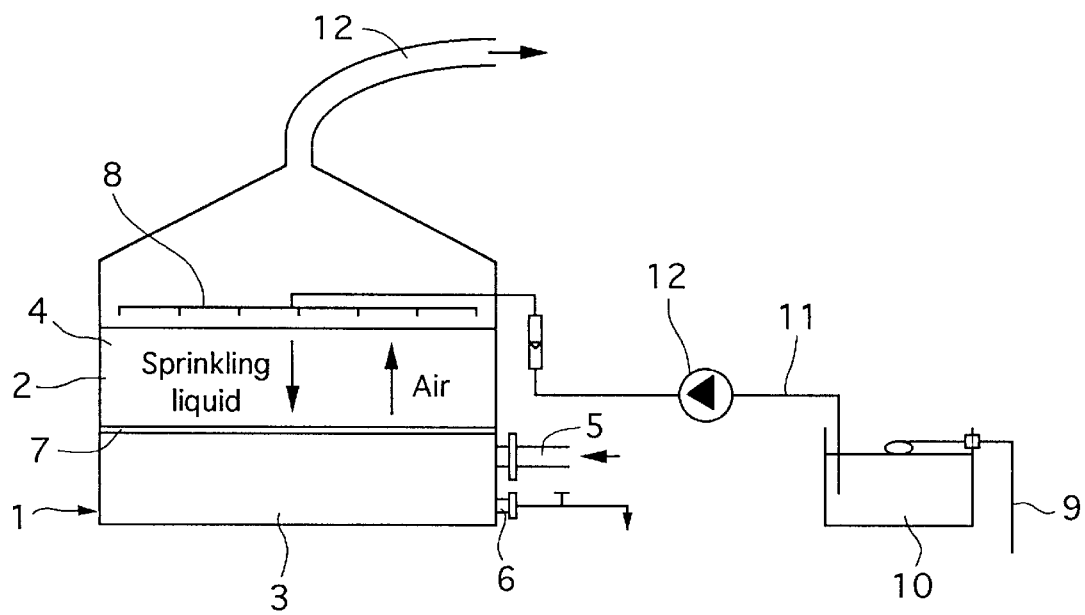
FIG. 1 gives a schematic view of a first embodiment of an installation for the implementation of the method according to the invention without the recirculation of the sprinkling liquid.

Referring to FIG. 1, the installation for the purification and deodorizing of gas effluents has a polyethylene vessel 1 demarcating essentially two chambers 2 and 3.

The upper chamber 2 is designed to receive a bed of inorganic material 4 formed by a granular clay slate having the grain size of 3 to 6 mm. The dimensions of the vessel 1 make it possible to receive a bed of clay slate having a thickness of 1 meter and a filtering surface area of 5 m$^2$.

The lower chamber 3 for its part is designed to receive the polluted air coming from a purification station conveyed by a conduit 5 as well as to distribute it throughout the filter. This chamber is also used to recover the sprinkling liquid after it crossed the bed of inorganic material and to remove it by a discharging outlet 6.

The two chambers 2 and 3 are separated by a screen 7 having a mesh size of 2 cm$^2$ used as a support for the inorganic material. This screen made of rigid plastic rests on pedestals housed in the base of the vessel and is itself covered with a synthetic cloth whose mesh size is ten times smaller than that of the screen.

The sprinkling water is conveyed by a sprinkler bar 8 provided with a series of nozzles evenly distributed above the filter, whose sprinkling angle varies from 90° to 120°. This water is water from drillings. This water is conveyed by a conduit 9 up to a flotation tank 10 and then pumped into another conduit 11 by a pump 12 directly towards the sprinkler bar 8.

As can be seen in FIG. 1, the filtering material is sprinkled without recirculation, in a counterflow to the passage of the gas effluent through the biofilter, the treated air being discharged into the upper part of the vessel 1 by a conduit 12.

During the use of the installation shown, the flow of polluted air coming by the conduit 5 has been fixed at 2,500 m$^3$/h giving a surface load of 500 m$^3$/meters/hour and a speed of effluent of 0.13 m/s (468 meters/h) for a period of stay of the air in the biofilter, during the treatment, of 7.2 seconds.

The sprinkling water delivery rate applied is 600 liters/h. The sprinkling is done for two minutes every thirty minutes.

The polluted air treated by the installation is essentially charged with ammonia and sulfurous compounds (mainly in the form of sulfides) and shows, on an average, shows the following pollutant content values, exceeding the nuisance thresholds except as regards organic nitrogen:

| | |
|---|---|
| H$_2$S | 40 mg/m$^3$ |
| CH$_3$SH | 10 mg/m$^3$ |
| total sulfides | 50 mg/m$^3$ |
| NH$_3$ | 1.5 mg/m$^3$ |
| organic nitrogen | 0.05 mg/m$^3$ |

The water from drillings used as sprinkling water has, for its part, the following main characteristics:

| | |
|---|---|
| pH = 7 to 7.5 | NO$_3$− = 8 to 13 mg/l |
| TAC = 30° C. | NO$_2$− = 0.5 mg/l |
| NTK = 4 mg N/l | PO$_4$− = 0.05 to 0.1 mg/l |
| NH$_4$+ = 2.5 mg/l | SO$_4$−− = 150 mg/l |
| OrgN = 1.5 mg/l | sulfides <0.01 mg/l |

After an adsorption phase of fifteen days, during which only the polluted air has gone through the filter in the absence of biomass and in the absence of sprinkling, the filter was seeded with a biomass constituted chiefly by *Thiobacillus thiooxydans, Thiobacillus thioparus* and *Thiobacillus intermedius*.

The installation was then used by implementing a sprinkling of the inorganic clay slate bed at the above-specified frequency, namely for two minutes every half an hour with short drying periods of only 28 minutes.

In order to attain a phosphate content high enough to enable the proper development of the biomass, the sprinkling water was doped with phosphates in the form of Na$_3$PO$_4$.

Eight samples a day were taken to measure the efficiency of the filter. These measurements consisted in measuring the concentration of the gas effluent, at the inlet of the filter and at its outlet, firstly the concentration in ammonia and secondly the concentration in sulfurous compounds, and then in computing the efficiency of abatement achieved by the filter. The results are given in the following Tables I, II and III respectively for sulfurous hydrogen, methyl mercaptan and ammonia.

TABLE I

Abatement of the $H_2S$ content (non-recirculated sprinkling water)

| Sample | Inlet mg/m$^3$ | Outlet mg/m$^3$ | Efficiency % |
|---|---|---|---|
| 1 | 34.3 | 0.09 | 99.7 |
| 2 | 15.7 | 0.17 | 98.9 |
| 3 | 23.2 | 0.29 | 98.7 |
| 4 | 30 | 0.18 | 99.4 |
| 5 | 106.6 | 17 | 83.9 |
| 6 | 7 | 0.29 | 95.8 |
| 7 | 0.28 | 0 | 100 |
| 8 | 4.98 | 0.15 | 97 |

TABLE II

Abatement of the methyl mercaptan $CH_3SH$ content (non-recirculated sprinkling water)

| Sample | Inlet mg/m$^3$ | Outlet mg/m$^3$ | Efficiency % |
|---|---|---|---|
| 1 | 6.7 | 3.2 | 51.5 |
| 2 | 11.3 | 6.2 | 45.4 |
| 3 | 13.6 | 6.7 | 50.6 |
| 4 | 11.52 | 5.42 | 52.6 |
| 5 | 20.8 | 11.7 | 43.9 |
| 6 | 30.1 | 2.3 | 23.4 |
| 7 | 18.6 | 7.5 | 59.8 |
| 8 | 3.7 | 1.9 | 47.1 |

TABLE III

Abatement of the ammonia content (non-recirculated sprinkling water)

| Sample | Inlet mg/m$^3$ | Outlet mg/m$^3$ | Efficiency % |
|---|---|---|---|
| 1 | 1.57 | 0.04 | 97.45 |
| 2 | 1.67 | 0.032 | 98.08 |
| 3 | 0.78 | 0.17 | 78.2 |
| 4 | 0.71 | 0.046 | 93.5 |
| 5 | 0.96 | 0.049 | 94.89 |
| 6 | 1.5 | 0.08 | 94.6 |
| 7 | 0.45 | 0.031 | 93.11 |
| 8 | 1.4 | 0.05 | 96.4 |

These results show the efficient abatement of the level of sulfurous compounds despite sudden and substantial variations in loads, and especially the excellent abatement of $H_2S$ levels, and also the very high abatement of ammonia levels.

Figure 2:
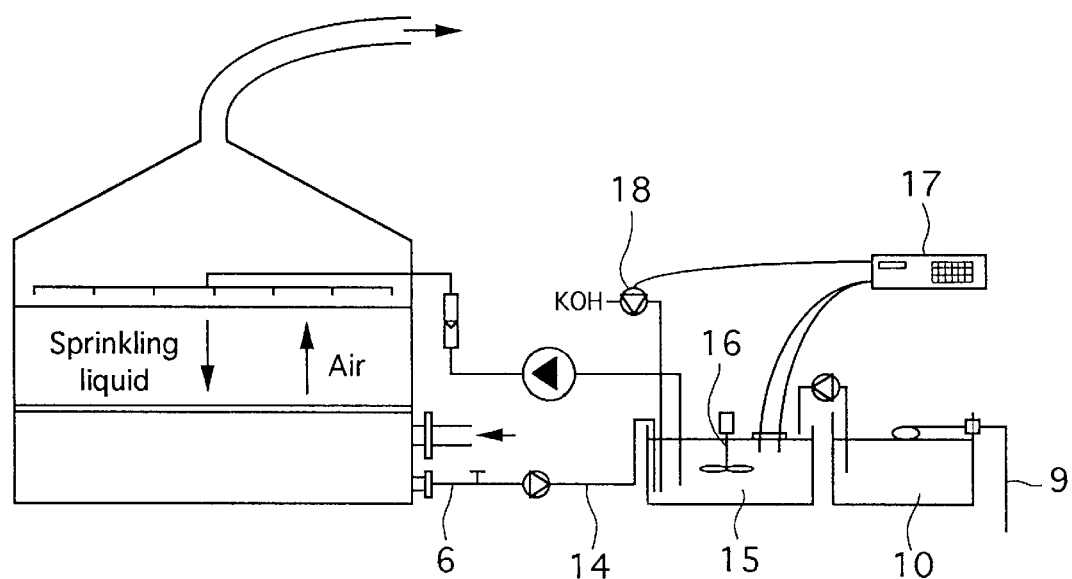
FIG. 2 gives a schematic view of a second embodiment of an installation for the implementation of the method according to the invention with the recirculation of the sprinkling liquid.

Referring to FIG. 2, a second embodiment of the installation has been implemented. This installation is identical to the installation shown in FIG. 1 except that it includes means for the recirculation of the sprinkling water. These means are constituted by a conduit 14 that is connected to the sprinkling liquid discharging outlet 6 at the outlet of the vessel 1 and is provided with a peristaltic pump enabling the rerouting of this water to a recirculation vessel 15 provided with a stirrer 16.

The vessel 15 is furthermore provided with control means 17 to check the pH of the water present in the vessel 15, controlling the means 18 for the addition of potassium into this water and to adjust the pH to 7.

During the use of the installation shown in FIG. 2, the loss of water by evaporation and nebulization in the vessel 15 was compensated for by the water from drillings, introduced continuously.

Furthermore, the sprinkling sequences were the same as above, namely two minutes of sprinkling every thirty minutes of operation.

Five samples a day were taken to measure the efficiency of the filter. These measurements consisted in measuring the concentration of the gas effluent at the inlet of the filter and at its outlet, firstly the concentration in ammonia and secondly the concentration in sulfurous compounds, and then in computing the efficiency of abatement achieved by the filter. The results are given in the following Tables IV, V and VI respectively for sulfurous hydrogen, methyl mercaptan and ammonia.

TABLE IV

Abatement of the $H_2S$ content (recirculated sprinkling water, pH 7)

| Sample | Inlet mg/m$^3$ | Outlet mg/m$^3$ | Efficiency % |
|---|---|---|---|
| 1 | 6.5 | 0.06 | 99 |
| 2 | 23 | 0.1 | 99.5 |
| 3 | 28 | 0.15 | 99.5 |
| 4 | 9.5 | 0 | 100 |
| 5 | 23.4 | 0 | 100 |

TABLE V

Abatement of the $CH_3SH$ content (recirculated sprinkling water, pH 7)

| Sample | Inlet mg/m$^3$ | Outlet mg/m$^3$ | Efficiency % |
|---|---|---|---|
| 1 | 4.5 | 2.3 | 49 |
| 2 | 23 | 13 | 54 |
| 3 | 19 | 8.5 | 57 |
| 4 | 8 | 2.5 | 67.5 |
| 5 | 9.8 | 2.75 | 72 |

TABLE VI

Abatement of the ammonia content (recirculated sprinkling water pH 7)

| Sample | Inlet mg/m$^3$ | Outlet mg/m$^3$ | Efficiency % |
|---|---|---|---|
| 1 | 1.37 | 0.071 | 94.8 |
| 2 | 0.56 | 0.05 | 91 |
| 3 | 0.28 | 0.05 | 82.1 |
| 4 | 0.14 | 0.056 | 60 |
| 5 | 0.23 | 0.05 | 78.2 |

These results show the very efficient abatement of level of sulfurous compounds, and more particularly of $H_2S$, and the excellent abatement of ammonia levels.

The application of a regulation of the pH by potassium made it possible to obtain high efficiency in the elimination of volatile sulfurous compounds and especially of $H_2S$.

Other tests were also conducted with the installation shown in FIG. 2, by regulating the pH of the sprinkling liquid at 3, the bacteria then drawing the carbon that they needed from the $CO_2$ gas coming from the degassing of the carbonates present in the sprinkling liquid.

The results in terms of abatement of the hydrogen sulfide levels are given in Table VII.

TABLE VII

Abatement of the H$_2$S content (recirculated sprinkling water pH3)

| Sample | Inlet mg/m$^3$ | Outlet mg/m$^3$ | Efficiency % |
|---|---|---|---|
| 1 | 18.2 | 0.13 | 99.3 |
| 2 | 25.4 | 0.21 | 99.2 |
| 3 | 23.7 | 0.22 | 99 |
| 4 | 41.1 | 0.3 | 99.3 |
| 5 | 13.6 | 0.07 | 99.5 |

Thus, excellent abatement of sulfurous pollution is observed also when the method is implemented with acidic pH.

Tests were also conducted after a period of non-sprinkling of over 24 hours. The results on hydrogen sulfide abatement are shown in Table VIII and indicate a major drop in this abatement.

TABLE VIII

Abatement of the H$_2$S content (after more than 24 hours without sprinkling

| Sample | Inlet mg/m$^3$ | Outlet mg/m$^3$ | Efficiency % |
|---|---|---|---|
| 1 | 28.5 | 6.6 | 76.7 |
| 2 | 1 | 0.35 | 63.5 |

Figure 3:
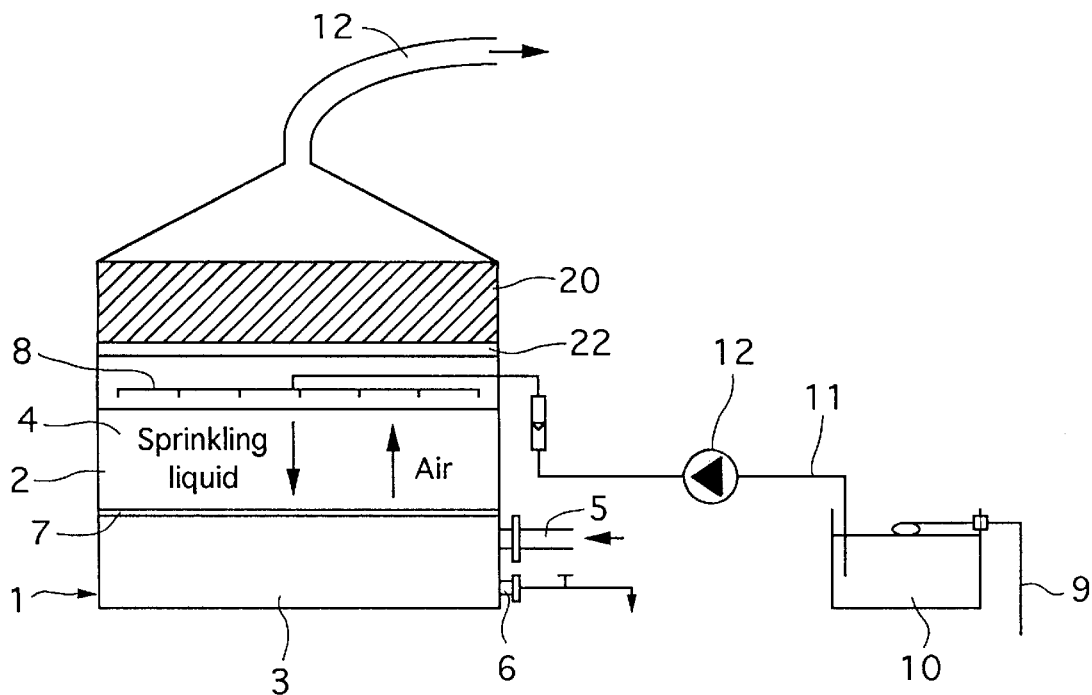
FIG. 3 and FIG. 4 show a third and a fourth embodiment of an installation for the implementation of the method according to the invention including a unit of granular activated carbon.
Figure 4:
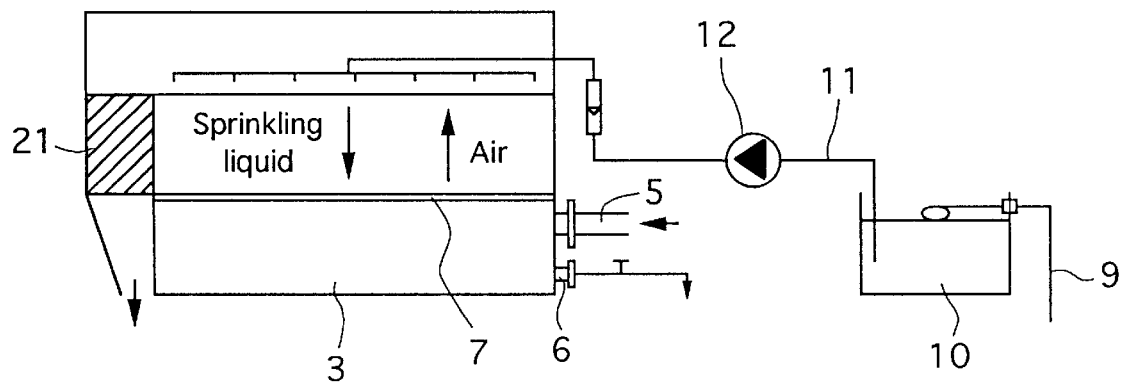

FIGS. 3 and 4 show two other embodiments of an installation according to the present invention, including a layer of activated carbon used to refine the filtration of gas effluent after its passage into the biofilter, wherein the effluent is present for 0.2 to 10 seconds.

In the installation shown in FIG. 3, this layer is placed in the vessel 1 above the sprinkler bar and is supported by a horizontal floor 22, the effluent then following a rising flow in the biofilter and a descending flow in the activated carbon layer 20.

In the installation shown in FIG. 4, this layer is placed around the vessel 1, the effluent then following a rising flow in the biofilter and a descending flow in the activated carbon layer 21. This layer could go all round the vessel 1.

It will be noted that in other embodiments it is also possible to consider providing for a refining unit with an activated carbon layer in a form that is totally independent and communicates with the outlet 12 for the discharging of the effluents at their exit from the biofilter. In this case, the air to be treated could be sent into the carbon filter either by direct back pumping or by suction and back pumping by an element interposed between the biofilter and the granular activated carbon unit or by a suction unit placed downline from the carbon filter.

The layer of activated carbon could also be placed directly on the layer of inorganic granular material, the sprinkler bar being then placed above the layer of activated carbon.

The suction of gas effluent could then be done by providing for a ventilator upline with respect to the bed of peat, possibly in addition to a ventilator.

The exemplary embodiments of the invention described herein are not designed to limit the scope of the invention. Consideration could therefore be given to making modifications thereto without going beyond the scope of the invention. In particular, the bed of inert organic material used as a support for the heterotrophic biomass could be formed by other materials than clay slate and the flow rates of effluents to be purified could be different from that indicated without departing from the context of the invention as defined by the claims.

What is claimed is:

1. A method for purifying and biodeodorizing a gas effluent charged with organic pollutant matter by abating H$_2$S, NH$_3$ and CH$_3$SH; said method including the steps of:
    (a) passing gas effluent to be purified and biodeodorized through a bed of inert mineral granular material; the bed of inert mineral granular material including thereon a biomass comprising bacteria, a majority of which are autotrophic bacteria;
        (i) the autotrophic bacteria comprising bacteria which aerobically degrades organic pollutant matter;
    (b) sprinkling the bed with a sprinkling liquid comprising water and optionally nutrient; the sprinkling liquid having a pH within the range of 3 to 14; a pH gradient being established within the bed from the sprinkling liquid gas effluent, and degradation products; and H$_2$S, NH$_3$ and CH$_3$SH are abated;
    (c) recovering purified and biodeodorized gas effluent from an outlet of the bed of inert mineral granular material;
    (d) said method being conducted such that all nutrients used by the biomass are supplied by the combination of the sprinkling liquid and the gas effluent; and,
    (e) said steps of passing gas effluent to be purified and biodeodorized through a bed of inert mineral granular material including a biomass thereon abates the pollutant matter by physical/chemical and biological processes.

2. A method according to claim 1, wherein:
    (a) said method is conducted such that all nutrients used by the biomass are supplied in the sprinkling liquid.

3. A method according to claim 1, wherein:
    (a) said method is conducted such that all nutrients used by the biomass are supplied in the gas effluent.

4. A method according to claim 1 including steps of:
    (a) removing at least a portion of sprinkling liquid from the bed and recirculating a portion of sprinkling liquid back to the bed.

5. A method according to claim 4 including a step of:
    (a) regulating pH of the sprinkling liquid applied to the bed to a pH within the range of 6–14.

6. A method according to claim 5 wherein:
    (a) said step of regulating pH comprises providing potassium in the sprinkling liquid.

7. A method according to claim 4 including a step of:
    (a) regulating pH of the sprinkling liquid applied to the bed to a pH of less than 6.

8. A method according to claim 1 including a step of:
    (a) removing at least a portion of sprinkling liquid from the bed.

9. A method according to claim 1 wherein:
    (a) said step of sprinkling comprises continuously sprinkling the bed, during said step of passing gas effluent through the bed.

10. A method according to claim 1, wherein:
    (a) said step of sprinkling comprises discontinuously sprinkling the bed, during said step of passing gas effluent through the bed.

11. A method according to claim 10, wherein:
    (a) said step of discontinuously sprinkling comprises periods between sprinkling of no more than 24 hours.

12. A method according to claim 1, wherein:
(a) the step of passing gas effluent through the bed comprises passing gas effluent upwardly through the bed; and
(b) said step of sprinkling the bed comprises passing sprinkling liquid downwardly through the bed in a counterflow to the gas effluent.

13. A method according to claim 1, wherein:
(a) said step of passing a gas effluent to be purified comprises passing a gas effluent including at least 1 mg/m$^3$ of ammonia and at least 1% by volume of $CO_2$.

14. A method according to claim 1, wherein:
(a) said step of sprinkling with sprinkling liquid comprises sprinkling with a liquid containing at least 1 mg/l nitrogen as ammonium compounds.

15. A method according to claim 1, wherein:
(a) said step of sprinkling with a sprinkling liquid comprises sprinkling with a liquid having a carbonate content of at least 10 mg/l.

16. A method according to claim 1, wherein:
(a) said step of sprinkling with a sprinkling liquid comprises sprinkling with a liquid having a phosphate content of at least 0.01 mg/l.

17. A method according to claim 1, wherein:
(a) said step of passing gas effluent through a bed of inert mineral granular material comprises passing gas effluent through a bed of inert mineral material selected from the group consisting of: clay; clay slates; alumina; activated alumina zeolites; sand; gravel; anthracite; and, activated carbon.

18. A method according to claim 17, wherein:
(a) said step of passing gas effluent through a bed of inert mineral granular material comprises passing gas effluent through a bed having a mineral grain size of greater than 1 mm.

19. A method according to claim 1, wherein:
(a) said step of passing gas effluent through a bed of inert mineral granular material comprises passing gas effluent through a bed having a mineral grain size of greater than 1 mm.

20. A method according to claim 1, wherein:
(a) said step of passing gas effluent through a bed of inert mineral granular material having a biomass thereon comprising bacteria comprises passing gas effluent through a bed including autotrophic bacteria which enables oxidation of sulfurous compounds; said autotrophic bacteria which enables oxidation of sulfurous compounds being selected from the group consisting of: *Thiobacillus thioxydous; Thiobacillus thioparus;* and, *Thiobacillus intermedius.*

21. A method according to claim 1, including the step of:
(a) removing gas effluent from the bed, after passage therethrough, and directing said gas effluent over at least one refining filtration unit.

22. A method according to claim 21, wherein:
(a) said step of directing gas effluent over at least one refining filtration unit comprises directing said gas effluent over a refining filtration unit including a bed of granular activated carbon.

23. A method according to claim 1, wherein:
(a) said step of sprinkling comprises sprinkling water selected from the group consisting of: water from drillings; natural water; supplemented water; and, outlet water from waste-water purification.

24. The method of claim 1, wherein said bed is configured and includes a sufficient amount of bacteria, of an appropriate type, to degrade pollutant matter in the gas effluent at gas effluent rate, passing through the bed, of at least 400 meters/hr.

* * * * *